United States Patent
Fu (10) Patent No.: US 10,180,703 B2
(45) Date of Patent: Jan. 15, 2019

(54) CONTROL METHOD AND WEARABLE DEVICE

(71) Applicants: Beijing Lenovo Software Ltd., Beijing (CN); Lenovo (Beijing) Co., Ltd., Beijing (CN)

(72) Inventor: Xusong Fu, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 461 days.

(21) Appl. No.: 14/863,787

(22) Filed: Sep. 24, 2015

(65) Prior Publication Data

US 2016/0327978 A1 Nov. 10, 2016

(30) Foreign Application Priority Data

May 5, 2015 (CN) .......................... 2015 1 0225086

(51) Int. Cl.
*G06F 1/16* (2006.01)
*G06F 3/01* (2006.01)

(52) U.S. Cl.
CPC .............. *G06F 1/163* (2013.01); *G06F 3/015* (2013.01)

(58) Field of Classification Search
CPC ................... G06F 1/163; G06F 3/015
See application file for complete search history.

(56) References Cited

U.S. PATENT DOCUMENTS

| | | |
|---|---|---|
| 8,581,859 B2 | 11/2013 | Okumura et al. |
| 9,729,697 B2 | 8/2017 | Song et al. |
| 2010/0164888 A1 | 7/2010 | Okumura et al. |
| 2014/0204235 A1* | 7/2014 | Wexler ............... H04N 5/23222 348/222.1 |
| 2014/0313863 A1 | 10/2014 | Lee et al. |
| 2014/0378113 A1 | 12/2014 | Song et al. |

(Continued)

FOREIGN PATENT DOCUMENTS

| | | |
|---|---|---|
| CN | 1549448 A | 11/2004 |
| CN | 1707308 A | 12/2005 |

(Continued)

OTHER PUBLICATIONS

Office Action regarding Chinese Patent Application No. 201510225086.2, dated Jun. 26, 2018. Translation provided by Unitalen Attorneys at Law.

*Primary Examiner* — Allan R Wilson
(74) *Attorney, Agent, or Firm* — Harness, Dickey & Pierce, P.L.C.

(57) ABSTRACT

A control method includes: determining whether a first signal is detected by a first detecting unit provided in a first fixing unit of a wearable device and a second signal is detected by the second detecting unit provided in a second fixing unit of the wearable device, in a case that the wearable device is in a first operating mode, wherein the first fixing unit and the second unit is configured to fix the wearable device on a user; and determining that the user wears the wearable device in a case that the first signal is detected by the first detecting unit and the second signal is detected by the second detecting unit, and switching the wearable device to a second operating mode, where the first operating mode is different from the second operating mode.

14 Claims, 3 Drawing Sheets

(56) References Cited

U.S. PATENT DOCUMENTS

| | | | |
|---|---|---|---|
| 2015/0070251 A1* | 3/2015 | Kim | G06F 1/163 345/8 |
| 2015/0092520 A1 | 4/2015 | Robison et al. | |
| 2016/0026867 A1* | 1/2016 | Wexler | H04N 5/2257 382/103 |
| 2016/0041048 A1* | 2/2016 | Blum | G01L 1/2206 73/774 |

FOREIGN PATENT DOCUMENTS

| | | |
|---|---|---|
| CN | 101782804 A | 7/2010 |
| CN | 203720703 U | 7/2014 |
| CN | 104238744 A | 12/2014 |
| CN | 104298352 A | 1/2015 |

\* cited by examiner

CONTROL METHOD AND WEARABLE DEVICE

This application claims priority to Chinese Patent Application No. 201510225086.2, entitled "CONTROL METHOD AND WEARABLE DEVICE", filed with the Chinese Patent Office on May 5, 2015, which is incorporated by reference in its entirety herein.

FIELD

The present disclosure relates to the field of electronic technology, and particularly to a control method and a wearable device.

BACKGROUND

With the development of science technology, a wearable device has been a trend to future development. In the conventional technology, the wearable device is controlled by physical buttons. Due to some reasons such as the negligence of people, the wearable device is in an on mode, an off mode or a sleep mode, when the user wears or takes off the wearable device. In this case, the user is required to repeatedly confirm or execute a wearing operation, which results in a tedious and inconvenient operation.

SUMMARY

In view of this, a control method and a wearable device are provided according to the disclosure, to realize an automatic control for the wearable device and simplify an operation.

An embodiment of the present disclosure provides a control method, which includes: determining whether a first signal is detected by a first detecting unit provided in a first fixing unit of a wearable device and a second signal is detected by a second detecting unit provided in a second fixing unit of the wearable device, in a case that the wearable device is in a first operating mode, wherein the first fixing unit and the second unit is configured to fix the wearable device on a user; and determining that the user wears the wearable device in a case that the first signal is detected by the first detecting unit and the second signal is detected by the second detecting unit, and switching the wearable device to a second operating mode, where the first operating mode is different from the second operating mode.

An embodiment of the present disclosure provides a wearable device, which includes: a first fixing unit; a second fixing unit, where the first fixing unit and the second fixing unit are configured to fix the wearable device on a user; a first detecting unit disposed at the first fixing unit and configured to detect a first signal; a second detecting unit disposed at the second fixing unit and configured to detect a second signal; a processing unit configured to switch the wearable device from a first operating mode to a second operating mode in a case that the first signal is detected by the first detecting unit and the second signal is detected by the second detecting unit, where the first operating mode is different from the second operating mode.

BRIEF DESCRIPTION OF THE DRAWINGS

In order to more clearly illustrate the technical solution in the embodiments of the present disclosure or in the conventional technology, in the following, drawings required in the description of the embodiments or the conventional technology will be introduced simply. Obviously, the drawings in the following description are just some embodiments of the disclosure. For those skilled in the art, other drawings can also be obtained according to the drawings without any creative work

DETAILED DESCRIPTION OF EMBODIMENTS

Hereinafter, the technical solutions in the embodiments of the present disclosure will be described clearly and completely in conjunction with the drawings in the embodiments of the present disclosure. Obviously, the described embodiments are only a part of the embodiments of the present disclosure, but not all the embodiments. All the other embodiments obtained by those skilled in the art based on the embodiments in the present disclosure without creative work will fall within the scope of protection of the present disclosure.

In an embodiment of the present disclosure, a wearable device at least has a first operating mode and a second operating mode. A first detecting unit is disposed at a first fixing unit, and a second detecting unit is disposed at a second fixing unit. When the wearable device is in the first operating mode, it is determined that the user wears the wearable device in a case that a first signal is detected by the first detecting unit and a second signal is detected by the second detecting unit, and then the wearable device is switched from the first operating mode to the second operating mode automatically. In this way, an automatic control for the wearable device is implemented, and an operation is simplified.

The embodiments of the present disclosure are described in detail below in conjunction with drawings.

Figure 1:
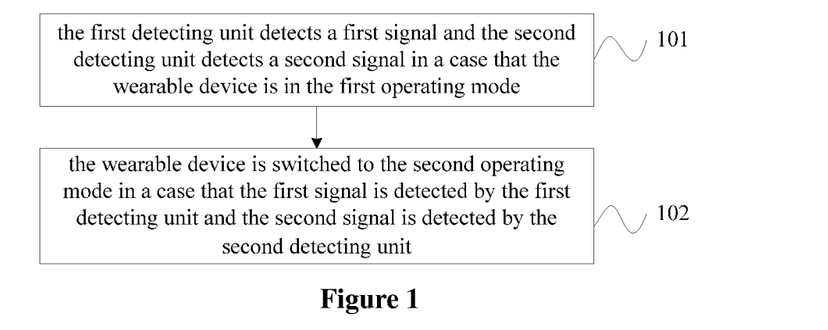
FIG. 1 is a flow diagram of a control method according to an embodiment of the present disclosure.

FIG. 1 is a flow diagram of a control method according to an embodiment of the present disclosure, which may be applied to a wearable device.

The wearable device includes a first fixing unit including a first detecting unit and a second fixing unit including a second detecting unit, where the first fixing unit and the second fixing unit are configured to fix the wearable device on the user. Specifically, the wearable device at least has a first operating mode and a second operating mode different from the first operating mode.

In an actual application, the wearable device may be a head-wearing device or a wrist-worn device. In the case of the head-wearing device such as intelligent glasses, the first fixing unit and the second fixing unit may be temples of the head-wearing device, to fix the head-wearing device onto the ears of the wearing user. In the case that of the wrist-worn device such as an intelligent watch, the first fixing unit and the second fixing unit may be a watch band of the wrist-worn device, which may be in a half-annular shape to ring a wrist of the user. The first fixing unit and the second fixing unit are connected to form an annular structure, to fix the wrist-worn device to the wrist of the user.

The control method may include steps 101-102.

Step 101 includes: determining whether a first signal is detected by the first detecting unit and a second signal is detected by the second detecting unit, in a case that the wearable device is in the first operating mode.

Step 102 includes: determining that the user wears the wearable device in a case that the first signal is detected by the first detecting unit and the second signal is detected by the second detecting unit; and switching the wearable device to the second operating mode.

In the embodiment of the present disclosure, the first detecting unit is disposed at the first fixing unit of the wearable device, and the second detecting unit is disposed at the second fixing unit, the first detecting unit and the second detecting unit are configured to detect signals, respectively. The wearable device can be switched from the first operating mode to the second operating mode in a case that signals are detected by both the first detecting unit and the second detecting unit, therefore effectively, simply and conveniently controlling the wearable device without manual operation of the user.

Specifically, in a case that the first signal is detected by the first detecting unit and the second signal is detected by the second detecting unit, it can be determined that the first fixing unit and the second fixing unit contacts with the body of the user, that is, the wearable device is worn by the user. In this case, the wearable device may be switched to the second operating mode.

The second operating mode may refer to a running mode, and the first operating mode may refer to a mode in which the wearable device can not be used normally, such as a sleep mode or an off mode.

In the first operating mode, an application in the wearable device suspends or stops running. The second operating mode is the running mode. In the second operating mode, the application in the wearable device starts running.

Specifically, resources consumed by the wearable device in the first operating mode are less than that in the second operating mode.

Therefore, in the embodiment of the present disclosure, instead of manually operating a physical key of the wearable device, the wearable device will start running automatically once being worn by the user. Thus, a simple and effective control for the wearable device can be realized. A problem that the user repeatedly wears the wearable device due to forgetting to manually start the wearable device can be avoided.

In order to further improve accuracy of the control, according to another embodiment of the present disclosure, an electronic device may further include a third fixing unit. The third fixing is configured to support the wearable device by taking the body of the user as a fixing point, in a case that the user wears the wearable device.

For example, the wearable device is a head-wearing device, which is worn on the head of the user. The third fixing unit is fixed at the nose of the user, which may be a nose pad of the head-wearing device.

In the embodiment, a third detecting unit can be further disposed at the third fixing unit.

Figure 2:
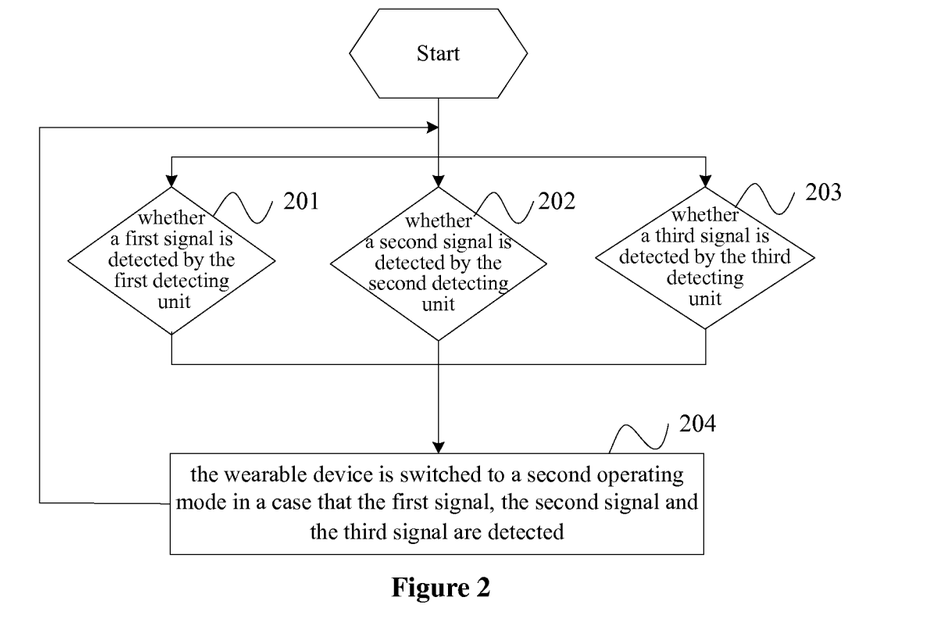
FIG. 2 is a flow diagram of a control method according to another embodiment of the present disclosure.

Therefore, as shown in FIG. 2, in the case that the wearable device is in the first operating mode, the control method may include steps 201 to 204.

Step 201 includes: determining whether a first signal is detected by a first detecting unit;

Step 202 includes: determining whether a second signal is detected by a second detecting unit;

Step 203 includes: determining whether a third signal is detected by a third detecting unit; and Step 204 includes: determining that the user wears the wearable device in a case that the first signal is detected by the first detecting unit, the second signal is detected by the second detecting unit and the third signal is detected by the third detecting unit; and switching the wearable device to a second operating mode.

The first detecting unit, the second detecting unit and the third detecting unit in the embodiment of the present disclosure are used to determine whether the user wears the wearable device. Resources consumed by the wearable device in the first operating mode are less than resources consumed in the second operating mode.

When the user wears the wearable device, all of the first detecting unit, the second detecting unit and the third detecting unit detect signals simultaneously. When the user does not wear the wearable device, the first detecting unit, the second detecting unit and the third detecting unit can not detect signals simultaneously.

Therefore, three detecting units are disposed on the respective fixing units of the wearable device. It can be determined that the user wears the wearable device in a case that signals are detected by the three detecting units. Then, the wearable device is switched from the first operating mode to the second operating mode automatically. In this way, the electronic device is controlled automatically, and a simple and convenient operation is realized without manual operation.

Figure 3:
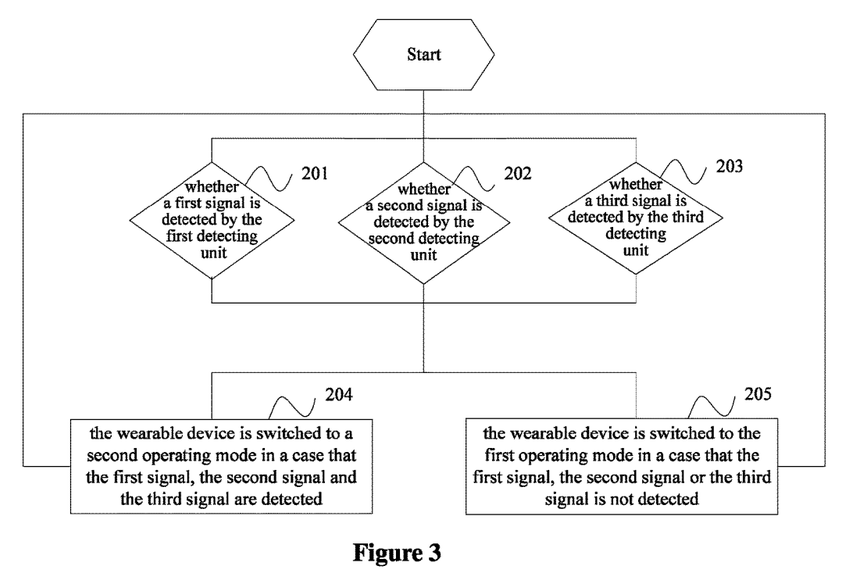
FIG. 3 is a flow diagram of a control method according to yet another embodiment of the present disclosure.

In a case that the wearable device is in the second operating mode, according to yet another embodiment of the present disclosure, after step 204, a control method further include step 205, as shown in FIG. 3.

Step 205 includes: determining that the user does not wear the wearable device in a case that the first signal is not detected by the first detecting unit, the second signal is not detected by the second detecting unit or the third signal is not detected by the third detecting unit; and switching the wearable device to the first operating mode.

In other word, if the user wears the wearable device, the first signal continues to be detected by the first detecting unit, the second signal continues to be detected by the second detecting unit, and the third signal continues to be detected by the third detecting unit. Therefore, it indicates that the user has taken off the wearable device in a case that any one of the first detecting unit, the second detecting unit and the third detecting unit can not detect the signal. In this case, the wearable device can be switched to the first operating mode automatically without manual operation of the use, and therefore a simple and convenient control for the wearable device can be realized. Because the resources consumed in the first operating mode are less than the resources consumed in the second operating mode, resource waste of the wearable device in the second operating mode due to user negligence can be avoided.

Specifically, the first detecting unit, the second detecting unit and the third detecting unit may be realized in multiple ways.

In a first possible implementation, the first detecting unit, the second detecting unit and the third detecting unit may be pressure sensors. When the user wears the wearable device, the first fixing unit, the second fixing unit and the third fixing unit contact with the body of the user, to detect pressure signals by the first detecting unit, the second detecting unit and the third detecting unit. Therefore, it can be determined that the wearable device is worn by the user. If any one of the detect units does not detect the pressure signal, it is determined that the wearable device is not worn by the user.

In another possible implementation, in the case that the wearable device is a head-wearing device, the first fixing unit and the second fixing unit press against the left ear and the right ear of the user respectively, and the third fixing unit presses against the nose of the user when the user wears the wearable device.

In this case, the first detecting unit and the second detecting unit may be heart-rate sensors, which are configured to detect the heartbeat of the user. The third detecting unit may be a pressure sensor configured to detect a pressure signal.

It is determined that the wearable device is worn by the user, in a case that heartbeat signals are detected by the first detecting unit and the second detecting unit, and the pressure signal is detected by the third detecting unit. Further, it is determined that the wearable device is not worn by the user, in a case that any one of the first detecting unit and the second detecting unit does not detect the heartbeat signal, or the third detecting unit does not detect the pressure signal.

In yet another possible implementation, when the user wears the wearable device, the first fixing unit and the second fixing unit contact with the body of the user body. Thus, the first detecting unit and the second detecting unit are connected to form a loop, and the first detecting unit generates a first signal and the second detecting unit generates a second signal in response to a triggering.

The first detecting unit and the second detecting unit may be electrode sensors, which can be connected with each other via the body of the user. The first signal and the second signal are both electrode signals, which can be detected by the first detecting unit and the second detecting unit when the user wears the wearable device.

The third detecting unit may be a pressure sensor. The third fixing unit presses against the user body when the user wears the wearable device, to detect a pressure signal by the third detecting unit.

However, it can be determined that the user does not wear the wearable device, in the case that the first detecting unit or the second detecting unit does not detect the electrode signal, or the third detecting unit does not detect the pressure signal.

Each of the first detecting unit and the second detecting unit is a sensor configured to collect the electrode signal. The first and the second detecting units are connected via the body of the user body, to implement an accurate detection and reduce the cost.

In order for a simple description, the method embodiments described above are described as a combination of a series of actions. However, those skilled in the art should understand that the present disclosure is not limited to an order of the described actions, since that some steps can be executed in other order or simultaneously based on the present disclosure. Secondly, those skilled in the art should understand that the embodiments described in the disclosure are preferred embodiments, and the related actions and modules are not necessary in the present disclosure.

Figure 4:
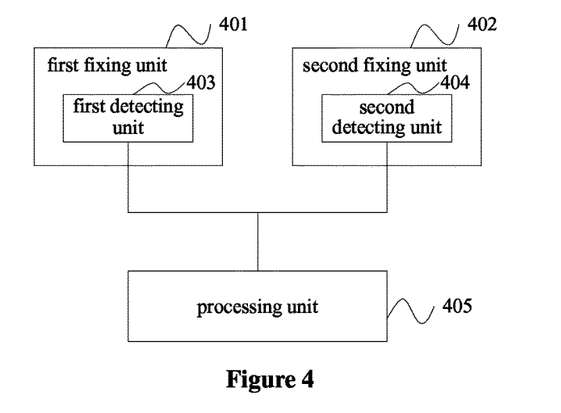
FIG. 4 is a schematic structural diagram of a wearable device according to an embodiment of the present disclosure.

Corresponding to the method embodiments described above, an embodiment of the present disclosure further provide a wearable device. FIG. 4 is a schematic structural diagram of a wearable device according to an embodiment of the present disclosure.

The wearable device may include:
a first fixing unit 401;
a second fixing unit 402, where the first fixing unit 401 and the second fixing unit 402 are configured to fix the wearable device on a user;
a first detecting unit 403 disposed at the first fixing unit 401 and configured to detect a first signal;
a second detecting unit 404 disposed at the second fixing unit 402 and configured to detect a second signal; and
a processing unit 405 configured to switch the wearable device from a first operating mode to a second operating mode in a case that the first signal is detected by the first detecting unit 403 and the second signal is detected by the second detecting unit 404, where the first operating mode is different from the second operating mode.

In an actual application, the wearable device may be a head-wearing device or a wrist-worn device. In the case of the wrist-worn device such as an intelligent watch, the first fixing unit and the second fixing unit may be a watch band of the wrist-worn device, which may be in a half-annular shape to ring a wrist of the user. The first fixing unit and the second fixing unit are connected to form an annular structure, to fix the wrist-worn device to the wrist of the user.

The wearable device is a head-wearing device such as intelligent glasses, the first fixing unit and the second fixing unit may be temples of the head-wearing device, to fix the head-wearing device onto the ears of the wearing user.

Figure 5:
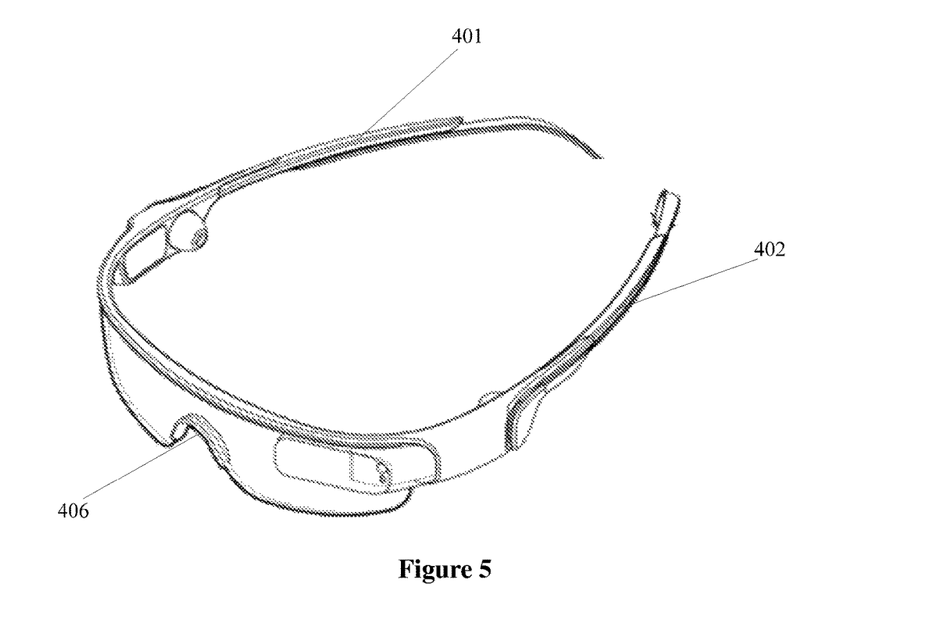
FIG. 5 is a schematic structural diagram of a wearable device according to an embodiment of the present disclosure in an actual application.

As shown in FIG. 5, a schematic structural diagram of a wearable device according to an embodiment of the present disclosure in an actual application is shown. The wearable device is the head-wearing device. The first fixing unit 401 and the second fixing unit 402 are two temples of the head-wearing device, which may press against the left ear and the right ear of the user in a case that the head-wearing device is worn by the user.

In the embodiment of the present disclosure, the first detecting unit is disposed at the first fixing unit of the wearable device, and the second detecting unit is disposed at the second fixing unit of the wearable device. Each of the first detecting unit and the second detecting unit are configured to detect a signal. The wearable device can be switched from the first operating mode to the second operating mode in the case that both the first detecting unit and the second detecting unit detect signals, therefore effectively, simply and conveniently controlling the wearable device without manual operation of the user Specifically, in a case that the first signal is detected by the first detecting unit and the second signal is detected by the second detecting unit, it can be determined that the first fixing unit and the second fixing unit contacts with the body of the user, that is, the wearable device is worn by the user. In this case, the wearable device may be switched to the second operating mode.

The second operating mode may refer to a running mode, and the first operating mode may refer to a mode in which the wearable device can not be used normally, such as a sleep mode or an off mode.

In the first operating mode, an application in the wearable device suspends or stops running. The second operating mode is the running mode. In the second operating mode, the application in the wearable device starts running.

Specifically, resources consumed by the wearable device in the first operating mode are less than that in the second operating mode.

Therefore, in the embodiment of the present disclosure, instead of manually operating a physical key of the wearable device, the wearable device will start running automatically once being worn by the user. Thus, a simple and effective control for the wearable device is realized. A problem that the user repeatedly wears the wearable device due to forgetting to manually start the wearable device can be avoided.

Figure 6:
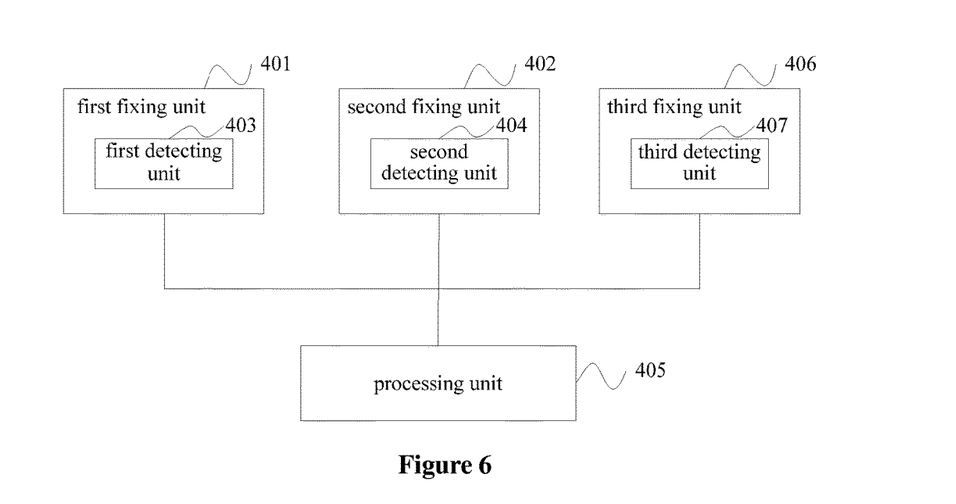
FIG. 6 is a schematic structural diagram of a wearable device according to another embodiment of the present disclosure.

In order to improve accuracy of the control, as shown in FIG. 6, a wearable device according to yet another embodiment of the present disclosure may further include:

a third fixing unit 406; and a third detecting unit 407 disposed at the third fixing unit 406.

In a case that the wearable device is worn by the user, the third fixing unit 406 supports the wearable device by taking the body of the user as a fixing point.

The processing unit 405 is further configured to switch the wearable device from the first operating mode to the second operating mode in a case that the first signal is detected by the first detecting unit 403, the second signal is detected by the second detecting unit 404 and the third signal is detected by the third detecting unit 407.

In the embodiment of the present disclosure, the first detecting unit, the second detecting unit and the third detecting unit are used to determine whether the user wears the wearable device. Resources consumed by the wearable device in the first operating mode are less than that in the second operating mode.

When the user wears the wearable device, all of the first detecting unit, the second detecting unit and the third detecting unit detect signals simultaneously. When the user does not wear the wearable device, the first detecting unit, the second detecting unit and the third detecting unit can not detect signals simultaneously.

Therefore, three detecting units are disposed on the respective fixing units of the wearable device. It can be determined that the user wears the wearable device in a case that signals are detected by the three detecting units. Then, the wearable device is switched from the first operating mode to the second operating mode automatically. In this way, the electronic device is controlled automatically, and a simple and convenient operation is realized without manual operation.

In an actual application, in a case that the wearable device is a head-wearing device, as shown in FIG. 5, the third fixing unit 406 is located at a nose pad of the head-wearing device. In a case that the wearable device is worn by the user, the first fixing unit 401 and the second fixing unit 402 press against the left ear and the right ear of the user respectively, and the third fixing unit 406 presses against the nose of the user.

When the wearable device is in the second operating mode, according to another embodiment of the present disclosure, the processing unit 405 may be further configured to determine that the user does not wear the wearable device in a case that the first signal is not detected by the first detecting unit, the second signal is not detected by the second detecting unit or the third signal is not detected by the third detecting unit; and switch the wearable device from the second operating mode to the first operating mode.

In other word, when the user wears the wearable device, the first signal continues to be detected by the first detecting unit, the second signal continues to be detected by the second detecting unit, and the third signal continues to be detected by the third detecting unit. Therefore, it indicates that the user has taken off the wearable device in the case that any one of the first detecting unit, the second detecting unit and the third detecting unit can not detect the signal. In this case, the wearable device can be switched to the first operating mode automatically without manual operation of the use, and therefore a simple and convenient control for the wearable device can be realized. Because the resources consumed in the first operating mode are less than the resources consumed in the second operating mode, resource waste of the wearable device in the second operating mode due to user negligence can be avoided.

In the embodiments described above, the first detecting unit 403, the second detecting unit 404 and the third detecting unit 407 can be realized in multiple ways.

In a first possible implementation, the first detecting unit, the second detecting unit and the third detecting unit may be pressure sensors. When the user wears the wearable device, the first fixing unit, the second fixing unit and the third fixing unit contact with the body of the user, to detect pressure signals by the first detecting unit, the second detecting unit and the third detecting unit. Therefore, it can be determined that the wearable device is worn by the user. If any one of the detect units does not detect the pressure signal, it is determined that the wearable device is not worn by the user.

In another possible implementation, in the case that the wearable device is a head-wearing device, the first fixing unit and the second fixing unit press against the left ear and the right ear of the user respectively, and the third fixing unit presses against the nose of the user when the user wears the wearable device.

In this case, the first detecting unit and the second detecting unit may be heart-rate sensors, which are configured to detect the heartbeat of the user. The third detecting unit may be a pressure sensor configured to detect a pressure signal.

It is determined that the wearable device is worn by the user, in a case that heartbeat signals are detected by the first detecting unit and the second detecting unit, and the pressure signal is detected by the third detecting unit. Further, it is determined that the wearable device is not worn by the user, in a case that any one of the first detecting unit and the second detecting unit does not detect the heartbeat signal, or the third detecting unit does not detect the pressure signal.

In yet another possible implementation, when the user wears the wearable device, the first fixing unit and the second fixing unit contacts with the body of the user. Thus, the first detecting unit and the second detecting unit are connected to form a loop, and the first detecting unit generates a first signal and the second detecting unit generates a second signal in response to a triggering.

The first detecting unit and the second detecting unit may be electrode sensors, which can be connected with each other via the body of the user. The first signal and the second signal are both electrode signals, which can be detected by the first detecting unit and the second detecting unit when the user wears the wearable device.

The third detecting unit may be a pressure sensor. The third fixing unit presses against the body of the user when the user wears the wearable device, to detect a pressure signal by the third detecting unit.

However, it can be determined that the user does not wear the wearable device, in a case that the first detecting unit or the second detecting unit does not detect the electrode signal, or the third detecting unit does not detect the pressure signal.

Each of the first detecting unit and the second detecting unit is a sensor configured to collect the electrode signal. The first detecting unit and the second detecting unit are connected with each other via the body of the user, to implement an accurate detection and reduce the cost.

In the embodiment of the present disclosure, when the wearable device is in the first operating mode, it is determined that the wearable device is worn by the user in the case that signals are detected by the first detecting unit, the second detecting unit and the third detecting unit, and then the wearable device is switched to the second operating mode automatically. When the wearable device is in the second operating mode, it indicates that the wearable device is not worn by the user in the case that any one of the first detecting unit, the second detecting unit and the third detecting unit does not detect the signal, and then the wearable device may be switched to the first operating mode automatically, therefore automatically, simply and conveniently controlling the wearable device.

The embodiments of the present disclosure are described herein in a progressive manner, with the emphasis of each of the embodiments on the difference between it and the other embodiments; hence, for the same or similar parts between the embodiments, one can refer to the other embodiments. For the device disclosed in the embodiments, the description thereof is simple since the device corresponds to the method disclosed in the embodiments, hence, the related parts can refer to the description of the method parts.

It should be illustrated that a relationship term such as "a first" and "a second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that a process, a method, an object or an equipment including a series of factors not only include the series of factors, but also include other factors not explicitly listed, or also include inherent factors of the process, the method, the object or the equipment. Without more limitation, a factor defined in a sentence "include one . . . " does not exclude a case that there is also another same factor in the process, the method, the object or the equipment including the described factor.

The above description of the embodiments herein enables those skilled in the art to implement or use the present disclosure. Various modifications to these embodiments will be apparent to those skilled in the art, and the general principle defined herein can be implemented in other embodiments without deviation from the spirit or scope of the present disclosure. Therefore, the disclosure will not be limited to these embodiments described herein, but in accordance with the widest scope consistent with the principle and novel features disclosed herein.

The invention claimed is:

1. A control method, comprises:
determining whether a first signal is detected by a first detecting unit provided in a first fixing unit of a wearable device and whether a second signal is detected by a second detecting unit provided in a second fixing unit of the wearable device, wherein the first fixing unit and the second fixing unit are configured to fix the wearable device on a user;
determining that the user does not wear the wearable device in a case that at least one of (i) the first signal is not detected by the first detecting unit and (ii) the second signal is not detected by the second detecting unit; and switching the wearable device to a first operating mode; and
determining that the user wears the wearable device in a case that the first signal is detected by the first detecting unit and the second signal is detected by the second detecting unit; and switching the wearable device to a second operating mode, wherein the first operating mode is different from the second operating mode.

2. The control method according to claim 1, wherein the wearable device further comprises a third fixing unit, the third fixing unit is configured to support the wearable device by taking the body of the user as a fixing point in the case that the user wears the wearable device, wherein a third detecting unit is disposed at the third fixing unit;
the determining that the user wears the wearable device in a case that the first signal is detected by the first detecting unit and the second signal is detected by the second detecting unit; and switching the wearable device to the second operating mode comprises:
determining whether a third signal is detected by the third detecting unit; and
determining that the user wears the wearable device in a case that the first signal is detected by the first detecting unit, the second signal is detected by the second detecting unit and the third signal is detected by the third detecting unit; and switching the wearable device to the second operating mode.

3. The control method according to claim 2, wherein after the switching the wearable device to the second operating mode, the method further comprises:
determining that the user does not wear the wearable device in a case that the first signal is not detected by the first detecting unit, the second signal is not detected by the second detecting unit or the third signal is not detected by the third detecting unit; and switching the wearable device to the first operating mode.

4. The control method according to claim 1, wherein in the case that the user wears the wearable device, the first detecting unit and the second detecting unit are connected to form a loop, and the first detecting unit generates the first signal and the second detecting unit generates the second signal in response to a triggering.

5. The control method according to claim 2, wherein in the case that the user wears the wearable device, the first detecting unit and the second detecting unit are connected to form a loop, and the first detecting unit generates the first signal and the second detecting unit generates the second signal in response to a triggering.

6. The control method according to claim 1, wherein the first operating mode is a sleep mode, and applications in the wearable device suspends running in the first operating mode; and the second operating mode is a running mode, and the applications in the wearable device starts running in the second operating mode.

7. The control method according to claim 2, wherein the first operating mode is a sleep mode, and applications in the wearable device suspends running in the first operating mode; and the second operating mode is a running mode, and the applications in the wearable device starts running in the second operating mode.

8. A wearable device, comprising:
a first fixing unit;
a second fixing unit, wherein the first fixing unit and the second fixing unit are configured to fix the wearable device on a user;
a first detecting unit disposed at the first fixing unit and configured to detect a first signal;
a second detecting unit disposed at the second fixing unit and configured to detect a second signal;
a processing unit configured to determine that the user does not wear the wearable device in a case that at least one of (i) the first signal is not detected by the first detecting unit and (ii) the second signal is not detected by the second detecting unit, and switch the wearable device to a first operating mode; and the processing unit further configured to determine that the user wears the wearable device in a case that the first signal is detected by the first detecting unit and the second signal is detected by the second detecting unit; and switch the wearable device to a second operating mode, wherein the first operating mode is different from the second operating mode.

9. The wearable device according to claim 8, further comprising:
a third fixing unit configured to support the wearable device by taking the body of the user as a fixing point, in a case that the user wears the wearable device; wherein a third detecting unit is disposed at the third fixing unit; and
wherein the processing unit is configured to determine that the user wears the wearable device and switch the wearable device to the second operating mode in a case that the first signal is detected by the first detecting unit, the second signal is detected by the second detecting unit and a third signal is detected by the third detecting unit.

10. The wearable device according to claim 9, wherein the processing unit is further configured to determine that the user does not wear the wearable device in a case that the first signal is not detected by the first detecting unit, the second signal is not detected by the second detecting unit or the third signal is not detected by the third detecting unit; and switch the wearable device to the first operating mode.

11. The wearable device according to claim 8, wherein in the case that the user wears the wearable device, the first detecting unit and the second detecting unit contacts with the body of the user to form a loop, and the first detecting unit generates the first signal and the second detecting unit generates the second signal in response to a triggering.

12. The wearable device according to claim 9, wherein in the case that the user wears the wearable device, the first detecting unit and the second detecting unit contacts with the body of the user to form a loop, and the first detecting unit generates the first signal and the second detecting unit generates the second signal in response to a triggering.

13. The wearable device according to claim 8, wherein the first operating mode is a sleep mode, and applications in the wearable device suspends running in the first operating mode; and the second operating mode is a running mode, and the applications in the wearable device starts running in the second operating mode.

14. The wearable device according to claim 9, wherein the first operating mode is a sleep mode, and applications in the wearable device suspends running in the first operating mode; and the second operating mode is a running mode, and the applications in the wearable device starts running in the second operating mode.

* * * * *